United States Patent [19]
Yoshida

[11] Patent Number: 4,698,538
[45] Date of Patent: Oct. 6, 1987

[54] DC BRUSHLESS ELECTROMAGNETIC ROTARY MACHINE

[75] Inventor: Makoto Yoshida, Machida, Japan

[73] Assignee: Aupac Co., Ltd., Tokyo, Japan

[21] Appl. No.: 870,966

[22] Filed: Jun. 5, 1986

[30] Foreign Application Priority Data

Jun. 5, 1985 [JP] Japan ................... 60-121737

[51] Int. Cl.$^4$ ................................. H02K 3/00
[52] U.S. Cl. ....................... 310/179; 310/46; 310/156; 310/177; 310/184; 310/214
[58] Field of Search ........... 310/177, 46, 156, 181, 310/179, 185, 186, 187, 188, 216, 254, 258, 214, 268, 180, 184

[56] References Cited

U.S. PATENT DOCUMENTS

| | | | |
|---|---|---|---|
| 3,257,572 | 6/1966 | Ludemann | 310/179 |
| 4,025,840 | 5/1977 | Brissey | 310/214 |
| 4,564,778 | 1/1986 | Yoshida | 310/177 |

*Primary Examiner*—R. Skudy
*Attorney, Agent, or Firm*—Birch, Stewart, Kolasch & Birch

[57] ABSTRACT

A dc brushless electromagnetic rotary machine, such as a dc electric motor or a dc electrical generator, includes a rotor having a permanent magnet which has the entirety of its cylindrical outer peripheral surface magnetized in the same polarity. The outer surface faces an annular armature core fixed on the inner cylindrical surface of a casing frame forming a stator of the machine. In the structure, the magnetic flux emanating from the rotor magnet passes the armature core and returns to the magnet from a position other than the armature core. The armature core is provided with coil windings on its cylindrical inner surface facing substantially the one surface portion of the permanent magnet. A portion of the coil windings is covered with a shielding member in which portion current is conducted which induces magnetic flux in a direction opposite to that of the magnetic flux generated from the permanent magnet. Additional magnetic flux induced in response to current flowing over the armature windings causes the main magnetic flux generated from the rotor magnet to be turned in the same way irrespective of the angular position of the rotor. Consequently, the current which is conducted in the armature windings to induce the magnetic flux in the direction opposite to that of the main magnetic flux does not prevent the torque for continuously rotating the rotor from being decreased.

10 Claims, 8 Drawing Figures

DC BRUSHLESS ELECTROMAGNETIC ROTARY MACHINE

BACKGROUD OF THE INVENTION

1. Field of the Invention

The present invention relates to a dc brushless electromagnetic rotary machine, such as a dc electric motor or a dc electric generator for transducing electrical energy into mechanical energy, or vice versa.

2. Description of the Prior Art

The applicant has previously proposed a brushless rotary electromagnetic machine of the type described and shown in U.S. Pat. No. 4,564,778 and Japanese Patent Laid-Open Publication (Tokkaisho) No. 59-181956. In such a brushless rotary electromagnetic machine of the type disclosed the magnetic poles induced in an armature core cause the magnetic flux for producing torque to be reduced to some extent, and also cause magnetic attractive and repulsive forces to be produced so as to reduce the rotary torque of the rotor of the machine.

Specifically with reference to FIGS. 1 and 2, the specific, conventional type of dc electromagnetic rotary machine has a rotor 1 which is rotatably supported by a stator frame, or casing, of the machine. Rotor 1 has a permanent magnet 4 which is annular and magnetized in a certain polarity in which the outer and inner surfaces thereof are uniformly magnetized in north and south poles, respectively. The outer cylindrical surface of permanent magnet 4 opposes armature cores 5 which are supported by the inner surface of stator frame 7.

The magnetic flux $\Phi$ emanating from the one pole of permanent magnet 4 passes through armature core 5, a magnetic flux forming members 6 and 3a, then returning to the other pole of permanent magnet 4 so as to form a loop of magnetic flux $\Phi$. The armature coil windings are carried on arms 5a and 5b of cores 5 in such a manner that a portion of the coil windings is positioned between permanent magnet 4 and armature core 5.

The conventional rotary machine of the type discussed has armature cores 5 each having arms 5a and 5b, on which magnetic poles N and S are induced associated with the magnetic flux $\Phi 1$ by the current conducted in the armature coil windings 8a and 8b. The closed loop of magnetic flux $\Phi 1$, thus produced, causes the magnetic flux $\Phi 1a$ induced around armature coil windings 8a by the current conducted therein to be reduced in magnitude so as to turn the main magnetic flux $\Phi$ to a less extent as shown in FIG. 3, resulting in weakening the torque rotating the rotor.

In addition, the magnetic poles N and S produced at the end portions of arms 5b and 5a of armature cores 5, respectively, cause repulsive and attractive forces FR and FQ with respect to the north poles of permanent magnet 4, resulting also in weakening the rotary torque of rotor 1.

With conventional dc electric generators, the same difficulties arise since they have the same structural features as of the motors. This can easily be seen from the fact that, for example, driving a rotor of a dc motor by any driving means will make it function as a generator to produce electric energy induced across its armature windings.

SUMMARY OF THE INVENTION

It is therefore an object of the present invention to provide a dc brushless electromagnetic rotary machine which is free from the prior art drawbacks described above, specifically, capable of efficiently producing torque or efficiently generating electric power.

In accordance with the present inveniton, a dc electromagnetic rotary machine includes a permanent magnet having a generally circular shape for producing magnetic flux and having one surface portion magnetized in one magnetic polarity and the other surface portion magnetized in the other magnetic polarity opposite to the one magnetic polarity. A rotor shaft fixedly carries the permanent magnet thereon within a casing including a magnetically permeable substance for rotatably supporting the rotor shaft is an armature core having a generally annular shape is fixedly supported by said casing so as to substantially face a first surface portion of the permanent magnet for permeating the magnetic flux therethrough. A coil means is supported by said armature core for conducting current therethrough. The coil means substantially faces the first surface portion of said permanent magnet. A magnetic-path forming means extends from said casing toward said rotor shaft means for bridging the magnetic flux between said casing and said permanent magnet; and shielding means shields a portion of said coil means which conducts current which induces magnetic flux in a direction opposite to that of the magnetic flux generated from said permanent magnet means, whereby the current flowing over said coil means causes the magnetic flux emanating from said permanent magnet means to be partially redirected.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Figure 4:
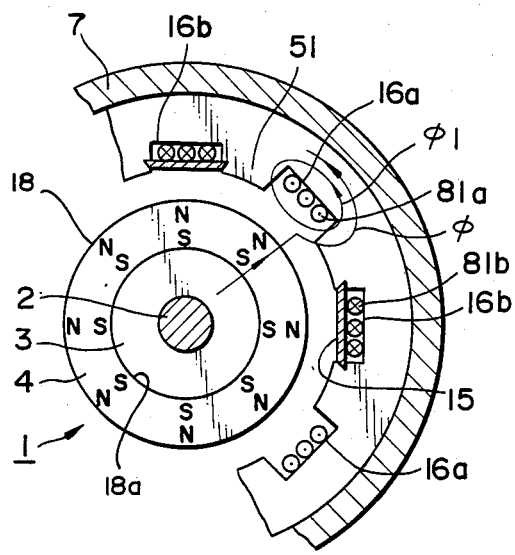
FIG. 4 is a lateral cross-sectional view partially showing an embodiment of a brushless electromagnetic rotary machine in accordance with the present invention.

With reference to FIG. 4, an illustrative embodiment of the present invention is directed to a dc brushless electric motor of the type which is similar in structure to the conventional machine shown in FIGS. 1 and 2 except for the structure of the armature system, as will be discussed later. In the following figures, similar components or structural elements are designated by the same reference numerals, and redundant description will be avoided for simplicity.

The dc brushless electric motor shown and described includes a rotary shaft 2 which is rotatably supported by a supporting means, not shown, the latter being fixed on a stator frame 7. Shaft 2 and frame 7 are made of magnetically permeable material. Stator frame 7 is generally cylindrical to enclose the substantial portions of the motor, and fixed on the base thereof, not shown.

On rotary shaft 2, a yoke is fixedly carried which is generally cylindrical and made of laminated layers of magnetic substance. Magnetic yoke 3 also carries fixedly a permanent magnet 4 that is also generally cylindrical so as to cover at least partially the outer periphery of yoke 3. Permanent magnet 4 is magnetically polarized in a predetermined orientation, in which magnet 4 has its outer cylindrical circumference magnetized in a first magnetic polarity, and its inner cylindrical periphery in the polarity which is opposite to the first polarity. In the illustrative embodiment, the outer circumference 18 has a north (N) magnetic pole and the inner circumference 8a-1 has a south (S) magnetic pole, as shown in the figures. Shaft 2, yoke 3 and magnet 4 form a rotor of the motor, as generally indicated by a reference numeral 1 in the figures.

Figure 1:
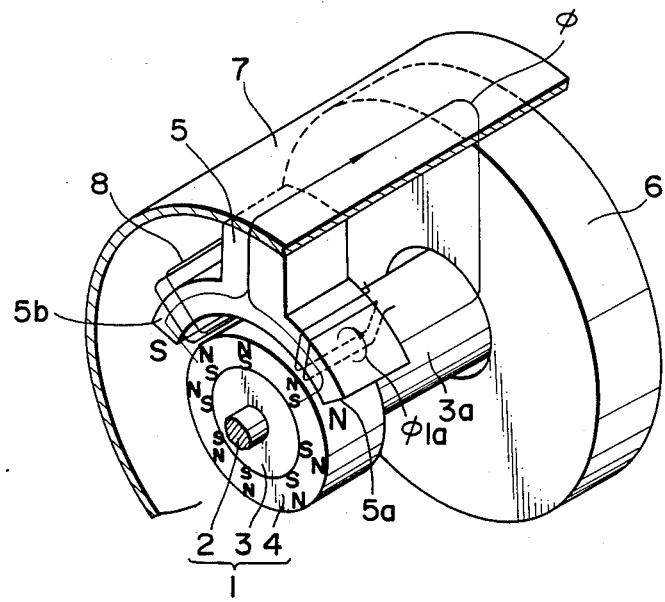
FIG. 1 is a partially broken-out perspective view showing a conventional brushless electric motor.
Figure 2:
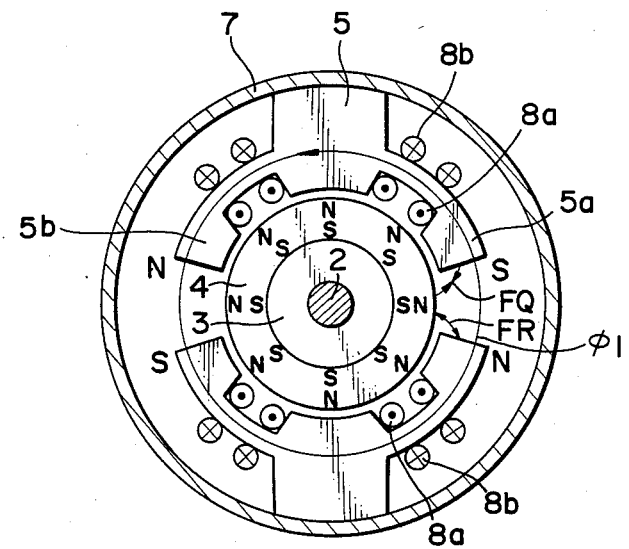
FIG. 2 shows the side end portion of the motor viewed from the left in FIG. 1.
Figure 3:
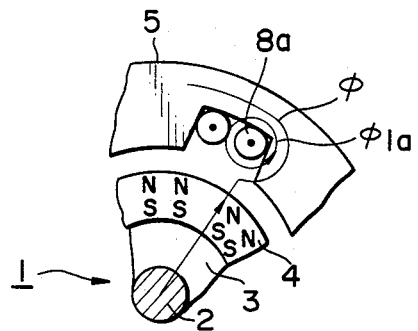
FIG. 3 is an enlarged view showing the side end portion of the motor shown in FIG. 1.

Within stator frame 7, there is provided a magnetic-path forming member 6 spaced from magnet 4 in the longitudinal direction of shaft 2, as shown in FIG. 1. Magnetic-path forming member 6 is generally of a disk-like shape and fixed on the inner cylindrical peripheral surface of stator frame 7. Alternatively, member 6 may be fixed on rotor shaft 2. Member 6 is also advantageously made of laminated layers of magnetic substance in order to conduct magnetic flux effectively therewithin. Member 6 has an opening which is generally cylindrical to pass a portion 3a of yoke 3 therewithin with a small spacing or air gap formed in between.

In the illustrative embodiment, an annular armature core 51 is also fixedly supported on the inner surface of frame 7 in a longitudinal position facing the outer surface 18 of magnet 4, instead of the conventional pair of armature cores 5 shown in FIG. 1. For simplicity only, a portion of core 51 is depicted in the figure. Armature core 51 may preferably be made of laminated layers of magnetic substance. Armature core 51 has longitudinal recesses or slots 16a and 16b in which armature coil windings 81a and 81b are supported, respectively. Coil windings 81a and 81b, provided in two adjacent grooves 16a and 16b, respectively, are continuous to form an armature coil. The inner peripheral surface of annular armature core 51 generally faces the outer surface 18 of magnet 4 with a spacing or air gap formed against the outer surface 18 of magnet 4 so as to concentrate and conduct therein the magnetic flux $\Phi$ which originates from permanent magnet 4, to direct it to annular core 51, as clearly understood from FIG. 4.

In the illustrative structure, magnetic flux $\Phi$ generated from the one pole N of permanent magnet 4 is conducted through the air gap, armature core 51, frame or stator yoke 7, flux forming or returning member 6, the air gap and rotary yoke or flux returning member 3a, and then returned to the other pole S of magnet 4, as shown in the figures by the arrows. The way of formation of the closed loop of magnetic flux $\Phi$ is similar to the conventional machine shown in FIGS. 1 and 2 except for the passage thereof in the structure of the armature.

As shown in FIG. 4, a wedge-shaped shielding member 15 is inserted into every second groove, i.e. in groove 16b. Shielding members 15 are adapted to close the opening of grooves 16b to substantially shield the magnetic flux produced by the current conducted in coil windings 81b in the direction opposite to the magnetic flux $\Phi$ which is produced by the permanent magnet 4. Shielding members 15 are made of a ferromagnetic substance. The coil windings 81b are hereinafter referred to as "ineffective coil windings". The other coil windings 81a, which are hereinafter referred to as "effective coil windings", conduct the current producing magnetic flux $\Phi 1$ in the direction parallel to the magnetic flux $\Phi$ produced by the permanent magnetic 4. The magnetic flux produced by the current in coil windings 81b is substantially shielded by shielding members 15 so as not to leak to the extent to which it would otherwise weaken the torque of rotor system 1.

In operation, when current is conducted through coil windings 81a and 81b, additional flux $\Phi 1$ is induced around windings 81a, as depicted by the arrow in FIG. 4. The additional flux $\Phi 1$ causes primary flux $\Phi$ originating from magnet 4 to be partially turned therearound as shown in FIG. 4. Such turning of flux $\Phi$ generates torque to rotor 1 in a clockwise direction in FIG. 4, in this instance. It should be noted that the magnetic flux produced by the current flowing in ineffective coil windings 81b will not substantially effect the magnetic flux $\Phi$ passing nearby due to the provision of shielding members 15.

Since permanent magnet 4 is magnetized in such a manner that the outer peripheral portion thereof is substantially uniformly magnetized to the same polarity, the north pole, for example, as discussed before, primary magnetic flux $\Phi$ is maintained constant in direction, so that the intersectional relationship between the primary flux $\Phi$ and the thus turned flux is also maintained the same. This constant flux directionality in continuous rotation of rotor 1 in the clockwise direction if the current is supplied in the same direction to armature coil windings 81a and 81b.

If current is supplied to armature windings 81a and 81b in the direction opposite to that described above, then the magnetic flux $\Phi$ generated from magnet 4 and passing near windings 81a in the air gap is turned in the opposite way. This results in applying continuous torque to rotor 1 in the counterclockwise direction in FIG. 2 to revolve rotor 1 continuously in the opposite direction. Namely, switching of the current supplied to armature windings 81a and 81b will effect turning of rotational direction of rotor 1. The degree or extent of turning the main flux $\Phi$ is associated with the current flowing through windings 81a, and hence the voltage applied across them, so that the higher the voltage, the faster rotor 1 rotates.

Figure 5:
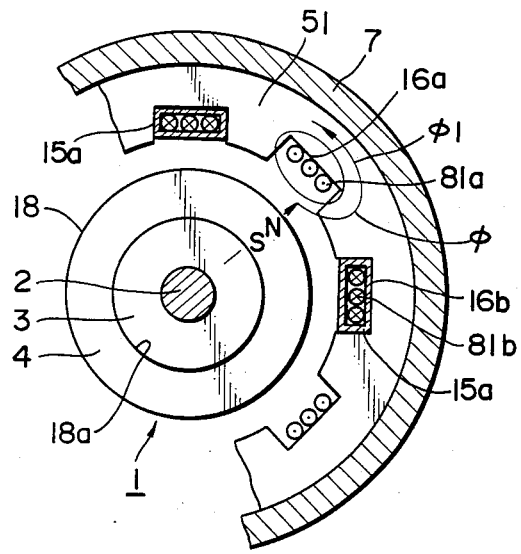
FIGS. 5 and 6 are lateral cross-sectional views showing other alternative embodiment of the invention.

An alternative embodiment of the present invention shown in FIG. 5 has shielding members 15a, which completely enclose or wrap ineffective coil windings 81b in grooves 16b of armature coil 51. Shielding members 15a may be constructed of a film made of ferromagnetic material. Those shielding members 15a prevent the magnetic flux produced from ineffective coil windings 81b from substantially leaking to the outside, as in the case of the FIG. 4 embodiment.

Figure 6:
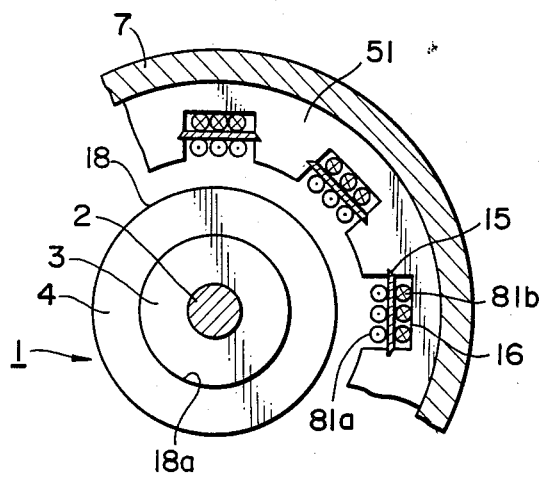

Another alternative embodiment shown in FIG. 6 is provided with annular armature core 51, of which the inner peripheral surface has slots 16 cut each of which includes effective and ineffective coil windings 81a and 81b, respectively, with shielding member 15 intervening in between. More specifically, a pair of grooves 16 adjacent to each other have both effective and ineffective coil windings 81a and 81b with effective windings 81a in a groove 16 interconnected to ineffective coil windings 81b in another groove 16 which is adjacent to the former one. The ineffective windings 18b are positioned on the bottom of the grooves 16 with shielding member 15 intervening between effective and ineffective windings 81a and 81b to shield the ineffective windings 81b from the outside. In other words, the two layers of windings 81a and 81b are magnetically separated from each other by shielding member 15 made of ferromagnetic material. Shielding members 15 prevent the magnetic flux produced from the lower layers of ineffective coil windings 81b in grooves 16 from substantially leaking to the outside, as in the case of the FIG. 4 embodiment.

Figure 7:
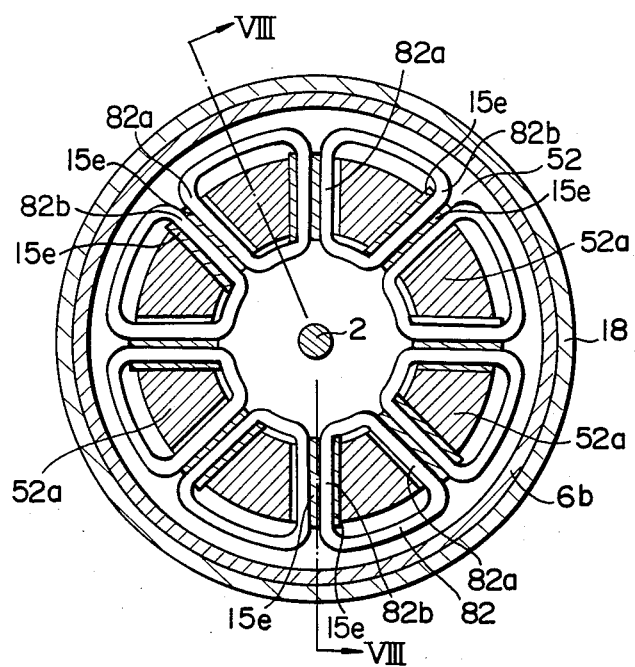
FIG. 7 is a lateral cross-sectional view depicting a further alternative embodiment of the present invention.
Figure 8:
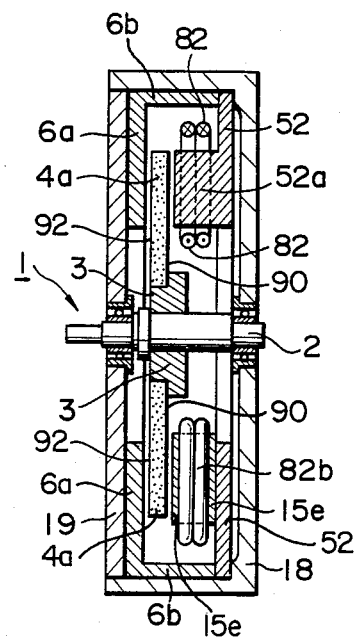
FIG. 8 is a longitudinal cross-sectional view showing the embodiment of FIG. 7 cut along the line VIII—VIII.

A still alternative embodiment is shown in FIGS. 7 and 8. This embodiment is directed to a dc motor which is thinner in its longitudinal direction. For that aim, rotor 1 includes a permanent magnet 4a which is of a flat disk-like shape with its one main surface 90 magnetized in a first polarity, and the other main surface 92 magnetized in a second opposite polarity, in this instance. Magnet disk 4a is supported by means of yoke 3 on rotor shaft 2.

A flat cylindrical casing 18, which is made of a nonmagnetic substance, is fixedly provided with disk-like magnetic-path forming members 6a and an annular armature core 52, both of which are separated from each other by a spacer yoke 6b, which is rather cylindrical. Member 4a has a circular, central opening which receives and passes rotatably rotor shaft 2. Armature core 52 has magnetic pole members 52a disposed on its main surface around in a circle. Each of magnetic pole members 52 carries armature windings 82. A portion 82b of each coil winding 82 is covered with a sheet of ferromagnetic shielding material 15e. The winding portions 82b function as the ineffective coil windings discussed with reference to FIGS. 4, 5 and 6.

The main magnetic flux produced from rotor magnet 4a starts at its north pole 90 to pass one air gap, pole members 52a, annular armature core 52, cylindrical yoke 6b, magnetic-path forming member 6a and the other air gap, and returns to permanent magnet 4a at the south pole 92 thereof. Upon conduction of current to coil windings 82, the additional magnetic flux thus induced over a portion 82a of coil windings 82 causes the main flux to be turned locally, as in the other embodiments described above. Consequently, torque will continuously be applied to rotor 1 in the predetermined circular direction as long as the current is applied to windings 82 in the same direction. Shielding members 15e prevent the magnetic flux produced by ineffective portions 82b of coil windings 82 carried by pole members 52a from substantially leaking to the outside, as described with reference to the FIGS. 4, 5 and 6 embodiments.

While the present invention has been described with reference to the particular illustrative embodiments, it is not to be restricted by those embodiments but only by the appended claims, It is to be appreciated that those skilled in the art can change or modify the embodiments without departing from the scope and spirit of the present invention.

The illustrative embodiments are directed to brushless dc motors. These embodiments are equally applicable to brushless dc generators in such a manner that driving the rotors by means of appropriate mechanical driving sources, such as a continuously rotated engine, will produce electric power from the armature windings in the polarity opposite to that supplied thereto in the case of the dc motors. The present invention is thus applicable to both dc motors and dc generators.

With brushless dc generators in accordance with the present invention, voltage appearing across the armature windings is dependent upon the angular speed of the rotors, so that the generators may be applied to tachogenerators producing voltage signals representative of the angular velocity of the rotor thereof. In addition, a dc motor having one or some of the armature coil windings used as a generator coil winding or windings may advantageously be applicable to a motor in which the revolution speed is self-controlled in response to the fed-back voltage induced across the generator winding or windings.

What is claimed is:

1. A dc electromagnetic rotary machine comprising:
   permanent magnet means having a generally circular shape for producing magnetic flux, said permanent magnet means having a first surface portion magnetized in a first magnetic polarity and a second surface portion magnetized in a second magnetic polarity opposite to the first magnetic polarity;
   rotor shaft means for fixedly carrying said permanent magnet means thereon;
   casing means including a magnetically permeable substance for movably supporting said rotor shaft means;
   armature core means having a generally annular shape and fixedly supported by said casing means so as to face substantially the first surface portion of said permanent magnet means for permeating the magnetic flux therethrough;
   coil means supported by said armature core means for conducting current therethrough, said coil means facing substantially the first surface portion of said permanent magnet means, said coil means including alternating first and second coil portions conducting current in substantially opposed directions;
   magnetic-path forming means extending from said casing means toward said rotor shaft means for bridging the magnetic flux between said casing means and said permanent magnet means; and
   shielding means for shielding only at least one said first portion of said coil means wherein current is conducted in said first portion which induces magnetic flux in a direction opposite to that of the magnetic flux generated from said permanent magnet means,
   said current flowing through said second coil portions causing the magnetic flux emanating from said permanent magnet means to be turned partially.

2. A machine in accordance with claim 1, wherein said armature core means has a cylindrical surface facing the first surface portion of said permanent magnet means and having a plurality of grooves formed therein in which said coil means is set,
   said shielding means comprising a sheet of ferromagnetic material for covering an opening of at least one of said grooves in which a first portion of said coil means is set.

3. A machine in accordance with claim 1, wherein said armature core means has a cylindrical surface facing the first surface portion of said permanent magnet means and having a plurality of grooves formed therein in which said coil means is set, said shielding means comprising film of ferromagnetic material for covering said at least one first portion of said coil means.

4. A machine in accordance with claim 1, wherein said armature core means has a cylindrical surface facing the first surface portion of said permanent magnet means and having a groove formed therein in which said coil means is set, said shielding means being provided in said groove to cover the first portion of said coil means, with the second portion of said coil means in said groove not covered with said shielding means.

5. A machine in accordance with claim 1, wherein said permanent magnet means is of a generally cylindrical shape, which has a first cylindrical surface portion magnetized in the first magnetic polarity and a second cylindrical surface portion opposite to the first surface portion magnetized in the second magnetic polarity.

6. A machine in accordance with claim 1, wherein said permanent magnet means is of a generally disk-like shape, which has a first main flat surface portion magnetized in the first magnetic polarity and a second main flat surface portion opposite to the first surface portion magnetized in the second magnetic polarity.

7. A machine in accordance with claim 6, wherein said armature core means comprises:
 a plurality of armature cores carrying said coil means thereon;
 said magnetic path forming means having a generally circular shape and comprising a magnetically permeable substance for connecting said plurality of armature cores disposed in circular around said rotor shaft means.

8. A machine in accordance with claim 7, wherein said shielding means comprises a sheet of ferromagnetic material for wrapping the first portion of said coil means.

9. A machine in accordance with claim 1, wherein said coil means is supplied with current to produce additional magnetic flux so as to cause the magnetic flux emanating from said permanent magnet means to be turned, thereby rotating said rotor means in an angular direction in dependence upon the current supplied.

10. A machine in accordance with claim 1, wherein said rotor shaft means is driven in rotation to produce current over said coil means, thereby producing electric power associated with the rotation of said rotor shaft means.

* * * * *